(12) United States Patent
Norman et al.

(10) Patent No.: US 6,178,332 B1
(45) Date of Patent: Jan. 23, 2001

(54) RADIO WITH HALTING APPARATUS AND METHOD

(75) Inventors: Oded Norman, Pardessiya; Moshe Refaeli, Tel Aviv; Boaz Perlman, Peduel; Yoram Salant, Rosh-Haain, all of (IL); Paul McAlinden, Austin, TX (US)

(73) Assignee: Motorola, Inc., Schaumburg, IL (US)

( * ) Notice: Under 35 U.S.C. 154(b), the term of this patent shall be extended for 0 days.

(21) Appl. No.: 09/263,544

(22) Filed: Mar. 8, 1999

(30) Foreign Application Priority Data

Apr. 24, 1998 (EP) .................................................. 98107473

(51) Int. Cl.⁷ ................................................. H04B 7/005
(52) U.S. Cl. ............................................ 455/502; 455/343
(58) Field of Search .................................... 455/502, 38.3, 455/574, 343; 375/356; 370/503

(56) References Cited

U.S. PATENT DOCUMENTS 5,101,510  3/1992  Duckeck ............................... 455/343
6,029,061  2/2000  Kohlschmidt ......................... 455/343

FOREIGN PATENT DOCUMENTS 0726 687 A1  8/1996  (EP) ................................. H04Q/7/32
0757 466 A2  2/1997  (EP) ................................. H04M/1/72

Primary Examiner—Nguyen Vo

(57) ABSTRACT

A radio (10) executes a method (100) for entering and exiting a halt status. Radio (10) has a control unit (18) and an internal timing unit (16). The timing unit (16) has execution logic (32), a status register (46) a counter (30) and a clock source (37). The control unit (18) writes instructions I(i) and their execution times T(i) to a memory (42) within the execution logic (32). One of these instructions is a 'SWITCH CLOCK' instruction causing the timing unit (16) to switch between clock signals. One of the instructions is 'HALT COUNTER' causing the radio (10) to enter a halt state. The radio (10) can be synchronized to the end of a first communication frame received by it after exiting a halt state.

9 Claims, 5 Drawing Sheets

RADIO WITH HALTING APPARATUS AND METHOD

FIELD OF THE INVENTION

The invention concerns a mobile radio with halting apparatus and a method of operation thereof.

BACKGROUND OF THE INVENTION

In cellular communication, mobile radios (i.e. "radio") and radio base stations (i.e. "base") exchange data and control signals. The base can serve more than one radio, and several bases can serve a plurality of radios in a defined geographic area. A single radio generally communicates with one base at a time. The radio and base need to be time synchronized in order for the transmitted and received signals to be properly interpreted by the radio and the base.

In both radio and base there are timing units for timing events executed within the radio and the base. Such timing units can include one or more counters. The counters are used to time various events occurring within the radio and base and for measuring time intervals. For example, one counter can count the number of communication frames being exchanged between base and radio, and another counter can be used to trigger events that occur within a communication frame.

When a radio does not transmit or receive communication frames, and when there are no events to be triggered, the timing unit of the radio and other parts of the radio are halted. The radio timing unit and other parts of the radio exit their halt mode when the radio receives new communication frames or when there is a need to execute or trigger events within the radio. The exact time at which a radio timing unit exits a halt state or the exact time at which the timing unit is first started is usually not synchronized with the beginning of a communication frame which is received by the radio, causing a non-deterministic operation of the radio, and a complication in software used to control the radio.

Another disadvantage of the prior art result from the need to control the shutting-down procedure solely by the control unit. When a halt status results in shutting down non-vital elements within the radio, the control unit has to check if the timing unit has finished timing events, before closing non-vital elements. The control unit can not check the timing unit status constantly, because it has to control other elements of the radio. For the reasons mentioned before, a time lapse between the moment in which non-vital elements can be closed and the moment in which the control unit checks the status of non-vital elements can occur. The energy that is consumed by the non-vital elements, during this time lapse is wasted. Prior art apparatus also cause complications in software.

A further disadvantage of prior art apparatus is that the control unit must deal with the interaction between itself and timing unit, adding a load on said control unit.

A still further disadvantage of the prior art arrangement is the usage of a single, high frequency clock, during the operation of the radio and also during its halt status. The timing unit receives a high frequency clock, which is required for the radio operation. The high frequency clock is not needed during the halt mode, and its usage causes a high energy consumption.

Accordingly, there is a continuing need for improved methods and apparatus for handling radio halt operation, and exiting halt status.

DETAILED DESCRIPTION OF THE DRAWINGS

An advantage of the present invention is that it provides an efficient, energy saving apparatus and method for handling radio halt status, and exiting halt status. Another advantage of the present invention is that it reduces the load on the control unit. A further advantage of the present invention is that it provides a more deterministic behavior of the radio. Yet a further advantage of the present invention is that it reduces the control unit software complexity.

Figure 1:
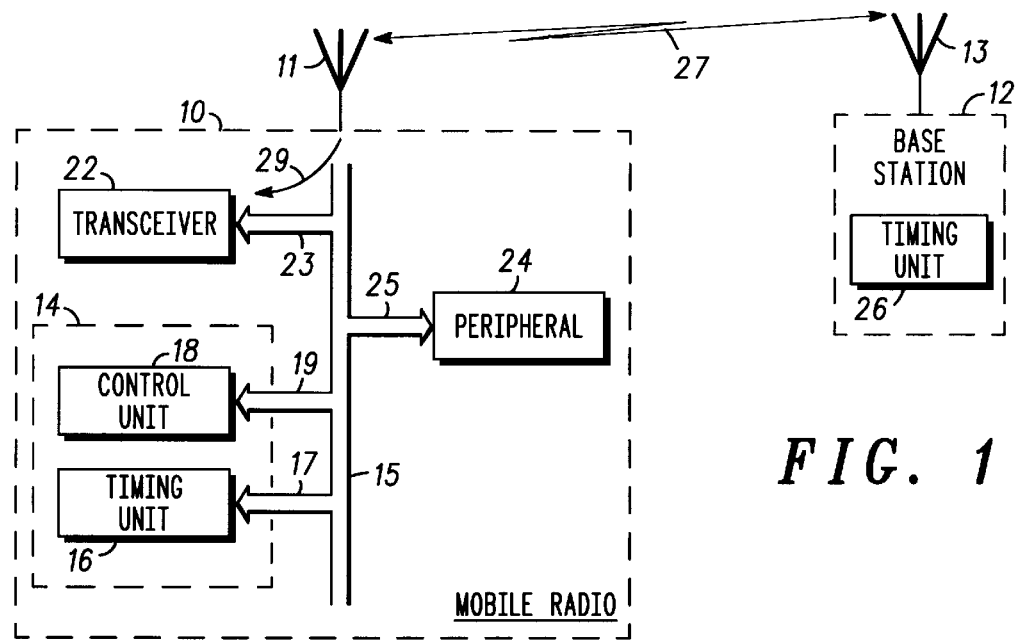
FIG. 1 is a simplified schematic diagram of a radio having a halting apparatus, communicating with base, according a preferred embodiment of the present invention.

FIG. 1 is a simplified schematic diagram of mobile radio 10 which operates in radio communication with base station 12 and has halting apparatus 14, according a preferred embodiment of the invention. Halting apparatus 14 includes timing unit 16 and control unit 18. Mobile radio 10 also has transceiver or receptor (i.e. transceiver) 22, optional peripheral 24, and antenna 11. Control unit 18 is conveniently a processor which controls the operation of radio 10 as a whole. Transceiver 22 and antenna 11 are conventional. Timing unit 16, control unit 18, transceiver 22 and peripheral 24 are conveniently coupled by bus 15 through bus connections 17, 19, 23 and 25 respectively, although other means well known in the art for coupling such elements can also be used. Base station 12 has timing unit 26 and antenna 13 and other conventional elements not depicted but well known in the art.

For purposes of explanation, it is assumed that base station 12 sends communication frames 27 to mobile unit 10, but this is not essential and the communication frames can be sent the other way. Communication frames 27 are coupled within mobile unit 10 as indicated by arrow 29 to transceiver 22 and thence by bus 15 to control unit 18 and timing unit 16. Control unit 18 and timing unit 16 cooperate as is more fully explained in connection with the figures that follow. Although the present invention is illustrated for the situation where mobile unit 10 is exchanging information with base station 12, persons of skill in the art will understand that base station 12 can also be another mobile unit and that mobile unit 10 can also be another base station, that is, elements 10 and 12 can be any kind of radios between which communication frames are exchanged. As used herein the words "mobile radio", "radio", "base" and "base station" are intended to include such variations.

Figure 2:
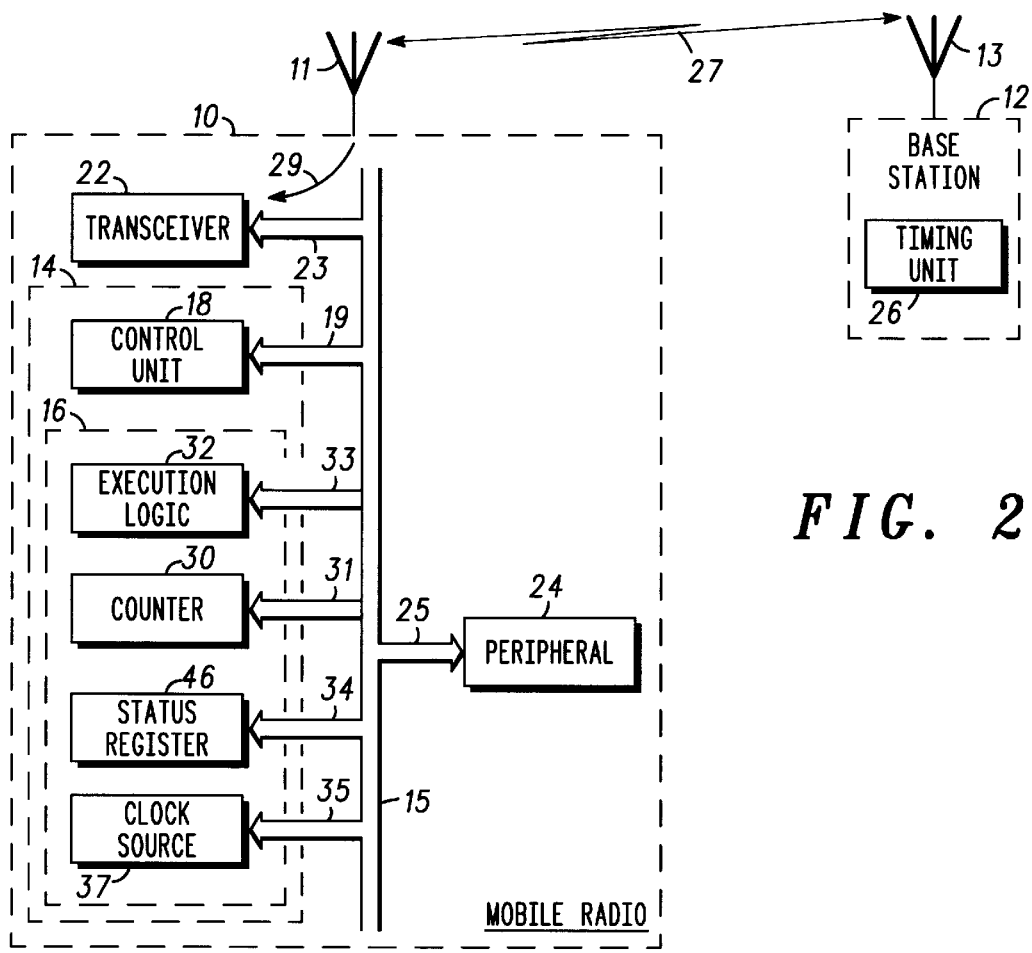
FIG. 2 is a simplified schematic diagram of the apparatus of FIG. 1 showing further details of the halting apparatus according to a first embodiment.

FIG. 2 is a simplified schematic diagram of the apparatus of FIG. 1 showing further details of the halting apparatus 14 according to a first embodiment. The same reference numbers are used to identify like elements in the figures. In FIG. 2, timing unit 16 is illustrated as comprising counter 30 coupled to bus 15 by bus connection 31, status register 46 coupled to bus 15 by connection 34, clock source 37 coupled to bus 15 by connection 35, and execution logic 32 coupled to bus 15 by bus connection 33. The cooperation of these elements is more fully explained in connection with FIGS. 3–5.

Figure 3:
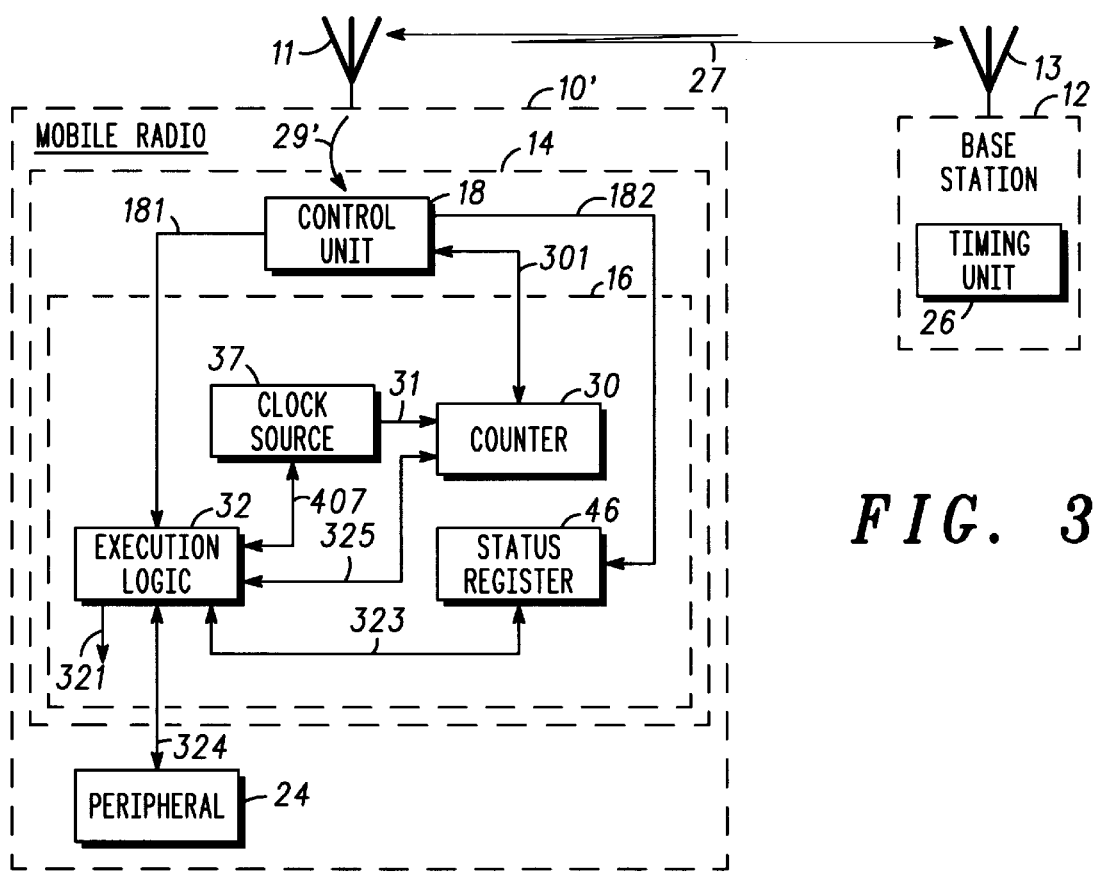
FIG. 3 is a simplified schematic diagram of the apparatus of FIG. 1 showing further detail, according to a second embodiment.

FIG. 3 is a simplified schematic diagram of the apparatus of FIG. 1 showing further detail according to a second embodiment. For convenience of explanation, transceiver 22 is omitted from radio portion 10' of FIG. 3.

FIG. 3 illustrates the arrangement wherein counter 30, execution logic 32, control unit 18, status register 46, clock source 37 and peripheral 24 are coupled independently of bus 15. Either arrangement is useful. In FIG. 3, control unit 18 receives communication frames 29' analogous to communication frames 29 of FIGS. 1–2.

Control unit 18 has output 181 coupled to execution logic 32 and output 182 coupled to status register 46. Execution logic 32 has output 321 analogous to bus connection 33 for coupling to other portions of radio 10 not shown in FIG. 3. Input/output (i.e. I/O) 323 of execution logic 32 is coupled to status register 46. I/O 325 of execution logic 32 is coupled to counter 30 and I/O 407 of execution logic 32 is coupled to clock source 37. Counter 30 has input 31 coupled to clock source 37, and I/O 301 coupled to control unit 18. Connection 324 analogous to bus connection 25 couples peripheral 24 to and from execution logic 32. Counter 30 receives clock input signal, via input 31, from clock source 37. This clock input signal causes counter 30 to increment (or decrement) by one count for each clock input signal. All the elements within the timing unit receive clock signals from the clock source 37. The details of the clock distribution network has been omitted for simplicity of explanation but will be understood by person of skill in the art. References to radio "10" are intended to include radio "10'".

While radio 10 is illustrated herein as having only one timing unit 16 and one counter 30, persons of skill in the art will understand that radio 10 can have multiple timing units 16 or multiple counters 30 or both which can be synchronized with related timing units and counters in base station 12 or elsewhere, and that the illustration of only one timing unit and one counter in radio 10 is merely for convenience of explanation.

In a preferred embodiment, control unit 18 loads a sequence of instructions into execution logic 32 that it is desired that radio 10 execute, for example, during a communication signal frame. Execution logic 32 contains a memory store for receiving these instructions. Associated with each instruction is a time value (e.g., counter count) when the particular instruction is to be executed, e.g., within a communication frame. However, such instructions are not limited to use within an individual frame. The execution logic sequentially executes each instruction at the time associated with each instruction, time being measured, for example, by counter 30.

Control unit 18 can cause a 'HALT COUNTER' or "SWITCH CLOCK" instruction and their execution times to be stored in execution logic 32, for example, along with other instructions for the relevant communication frame.

Execution logic 32 executes the stored instructions in sequence, each instruction being executed at the associated execution time stored with the instruction. 'HALT COUNTER' instruction is preferably the last instruction of a set of instructions. When the 'HALT COUNTER' instruction is executed, execution logic 32 causes the non-vital elements within timing unit 16 to be shut down and sets a "close indication" flag (e.g. a first flag) within status register 46 indicating that non-vital elements were closed. The first flag can be read by control unit 18.

The 'HALT COUNTER' instruction can be replaced by a "close request" flag (e.g. a second flag) and an "execution indication" flag (e.g. a third flag) within status register 46.

While executing instructions, execution logic 32 conveniently sets the third flag within status register 46, and resets the third flag after executing a set of instructions stored within execution logic 32. Preferably, each set of instructions includes a plurality of instructions that are executed during a single communication frame. Preferably, the third flag is reset by a special instruction 'RESET THIRD FLAG' stored within execution logic 32.

If control unit 18 decides to close non-vital elements it sets the second flag within status register 46. Execution logic 32 reads the second flag, and if the second flag is set it reads the third flag, and if it is reset, execution logic 32 closes non-vital elements and resets the first flag within status register 46.

If a 'HALT COUNTER' instruction or a third and second flags are used to halt, the programmer can choose to halt the radio immediately or after executing the whole set of instructions, by setting or resetting a "close mode" flag (e.g. a fourth flag) within status register 46. If the programmer decides to close non-vital elements after the execution of the current instruction the fourth flag is set. Execution logic 32 reads the fourth flag, and if it is set, it closes non-vital elements, immediately.

When a "SWITCH CLOCK" instruction is reached, clock source 37 selects one of two clock signals and divides the selected clock signal frequency by a programmable constant. Control unit 18 writes the programmable constant to a clock register (e.g. element 52 in FIG. 4) prior to the execution to the 'SWITCH CLOCK' instruction. For example, when entering a halt mode, clock source 37 will select a lower frequency clock signal and divides the signal by a first constant. When the radio exits halt status, the instruction "SWITCH CLOCK" will cause the clock divider to select a higher frequency clock and divide it by a second higher constant.

Those who are skilled in the art will appreciate that "SWITCH CLOCK" instruction and clock source 37 can be used whenever there is a need to select between one out of a plurality of clocks having different frequencies. The clock divider (see 54 in FIG. 4) allows timing unit 16 to work with a variety of clock signals, having a variety of frequencies.

Status register 46 conveniently contains a "timing unit status" flag (e.g. a fifth flag) that indicates whether timing unit 16 was just started or if timing unit 16 exited halt status. When timing unit 16 is stopped or when it enters halt status, execution logic 32 sets the fifth flag. After timing unit 16 counter first rolls over, to begin a new count at the end of a communication frame, it sends a signal to execution logic 32, to reset the fifth flag.

Status register 46 conveniently contains a "synchronization" flag (e.g. a sixth flag) determining whether execution logic 32 will operate with synchronization to the end of the frame (i.e. operate in synchronized mode) or not. When the sixth flag is set, and timing unit 16 is started or when timing unit 16 exits a halt status, the execution of instructions, stored in execution logic 32 is postponed until the first roll over of counter 30, occurring at the end of a communication frame.

If the sixth flag is set, no event is executed during the communication frame in which timing unit 16 is started or has exited a halt status, regardless of the time when timing unit 16 was started or exited a halt status. An event having execution time of T(i) is executed at T(i). If the sixth flag is reset, instructions are executed as before.

Figure 4:
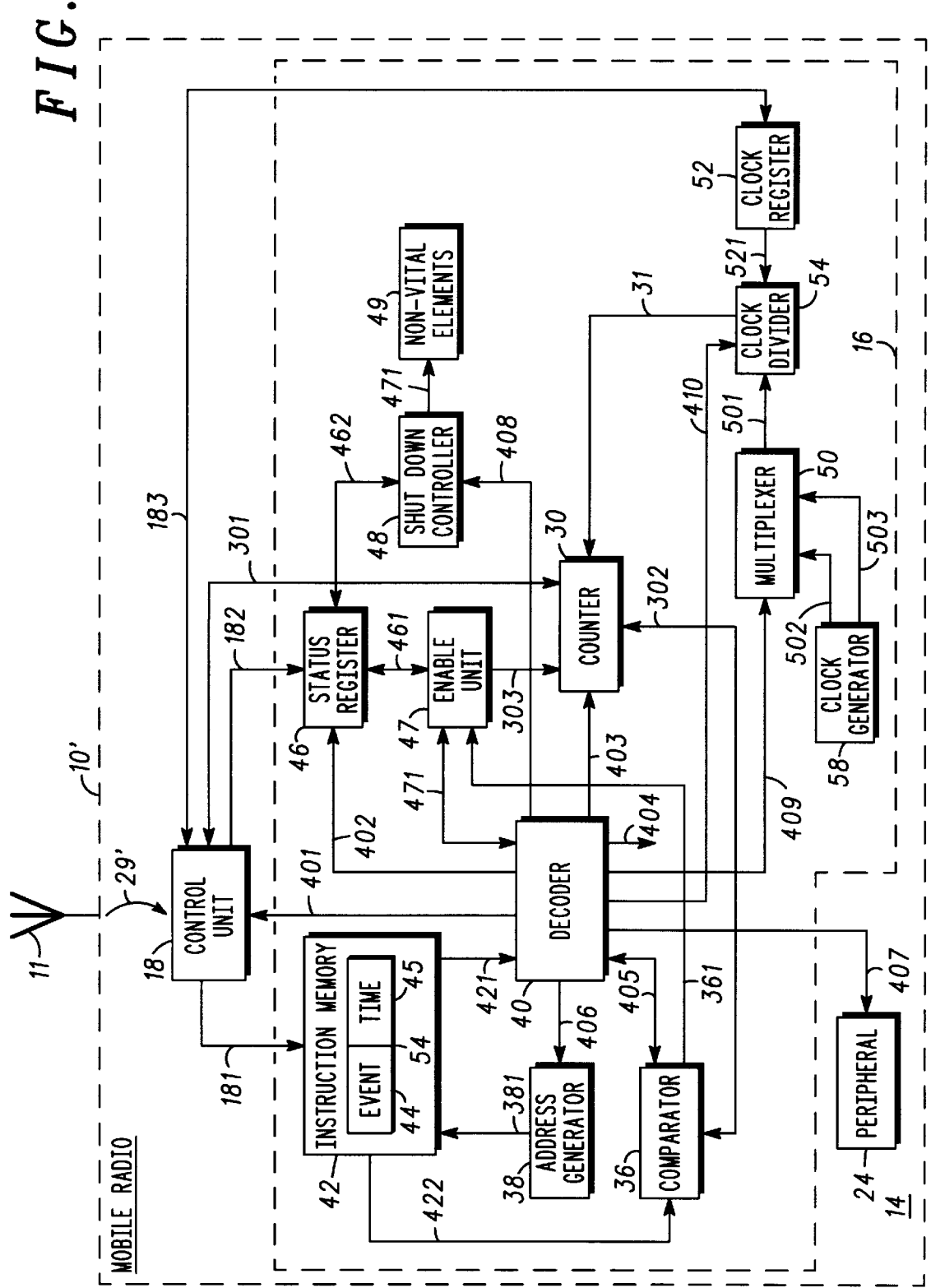
FIG. 4 is a simplified schematic diagram of the apparatus of FIG. 3 showing still further details.
Figure 5:
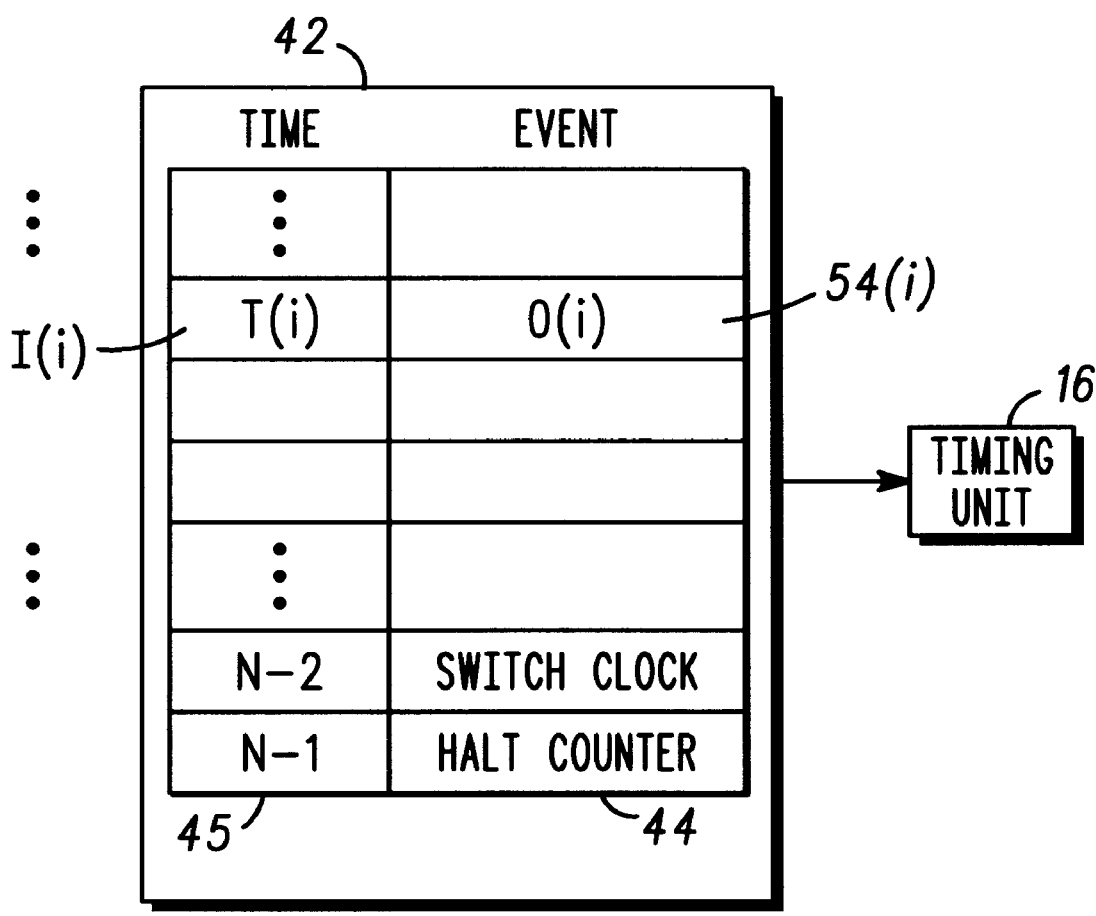
FIG. 5 is simplified schematic diagram showing pictorially how a COUNTER HALT command or SWITCH CLOCK command is provided.
Figure 6:
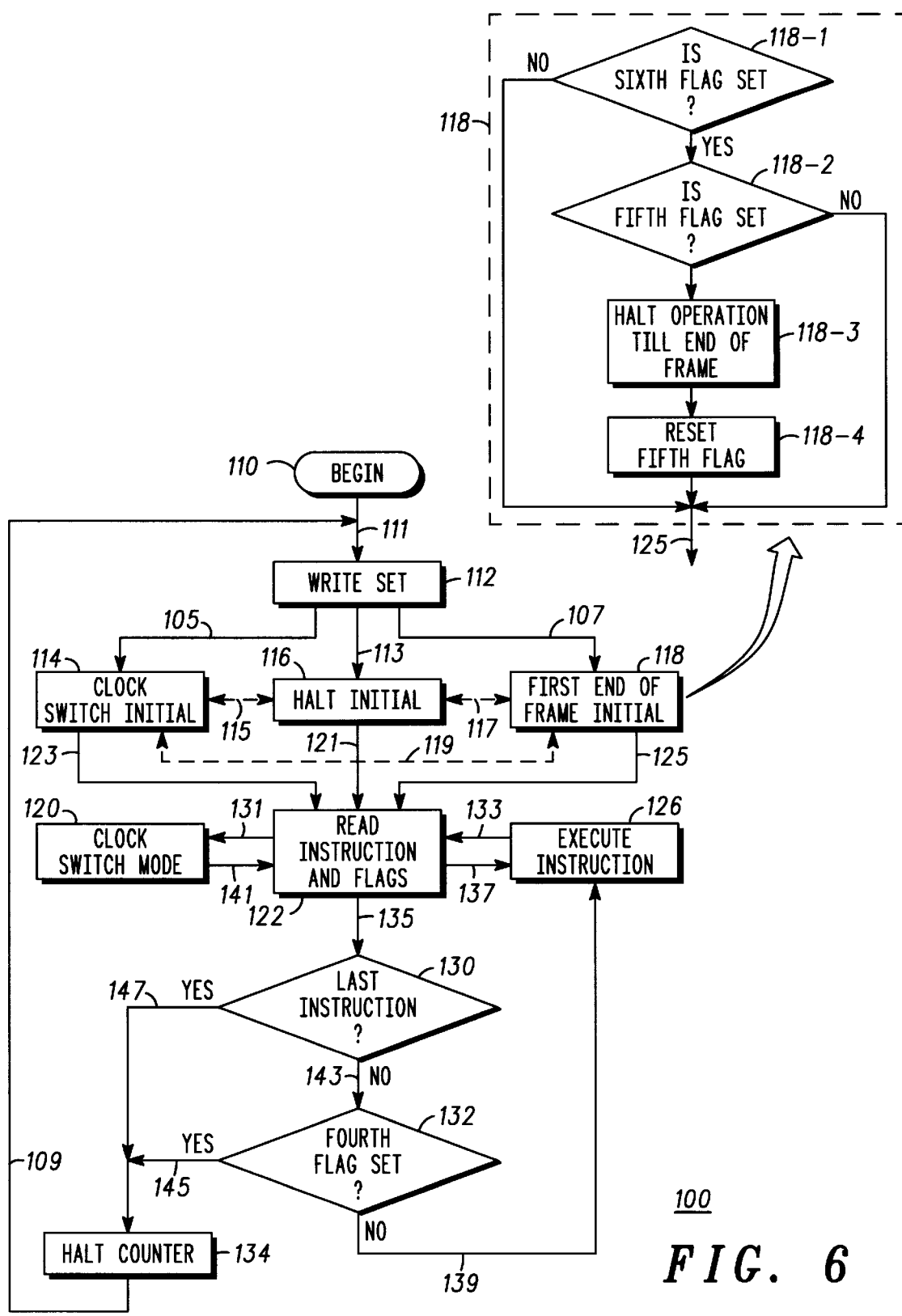
FIG. 6 is a flow diagram of a method for synchronizing the radio, according to a preferred embodiment of the present invention.

The cooperation of the elements in FIG. 3 is explained more fully in connection with FIGS. 4–6.

FIG. 4 is a simplified schematic diagram of halt apparatus 14 of radio 10 comprising timing unit 16 of radio portion 10' of FIG. 3 but showing still further detail. The same reference numbers are used to identify the same elements in the figures.

Timing unit 16 comprises control unit 18, comparator 36, address generator 38, decoder 40, instruction memory 42, status register 46, enable unit 47, shut down controller 48, optional non-vital elements 49, multiplexer 50, clock register 52, clock divider 54, clock generator 58, peripheral 24 and counter 30.

Instruction memory 42 has instructions I(i) stored therein at locations 54(i) (see FIG. 5). Each instruction I(i) comprises EVENT operand O(i) stored in memory portion 44 and execute TIME T(i) stored in memory portion 45. TIME T(i) specifies the execution time (e.g., in counts of counter 30) of operand O(i). When memory 42 is addressed, both the EVENT operand and its execution TIME are stored or retrieved, as the case may be. Control unit 18 provides output 181 to memory 42 to load instructions I(i).

Execution logic 32 operates under the control of control unit 18 which supplies EVENT and TIME instructions to memory 42, and receives feedback on what instructions have been decoded by decoder 40 via line 401.

Memory 42 provides output 421 to decoder 40 and output 422 to comparator 36. Memory 42 also receives output 381 from address generator 38. While memory 42 is depicted here as being a single memory with EVENT and TIME portions 44, 45, this is merely for convenience of explanation and, as those of skill in the art will understand based on the teachings herein, multiple memories can also be used.

Decoder 40 receives signals from memory 42 on line 421 and provides output 401 to control unit 18, output 402 to status register 46, output 403 to counter 30, output 405 to comparator 36, output 406 to address generator 38, output 408 to the shut down controller 48, output 409 to multiplexer 50, and output 410 to clock divider 54. Preferably decoder 40 provides output 407 to peripheral 24, output 471 to enable unit 47 and output 404 to the remainder of radio 10 (not shown in FIG. 4). As is more fully explained in connection with FIGS. 6–7, decoder 40 interprets instructions delivered from memory 42 and issues commands to elements 18, 24, 30, 36, 38, 46, 47, 50, 54 according to the nature of each instruction.

Address generator 38 receives, for example, an 'end-of-instruction' messages from decoder 40 and generates a command on output 381 to load the next instruction from memory 42 into decoder 40 and comparator 36, depending on the instruction. Also, depending on the instruction operand, decoder 40 can issue an instruction or trigger signal to peripheral 24 on line 407 or to another portion (not shown) of radio 10 on output 404. Peripheral 24 is intended to represent any other portion of radio 10. Line 404 can also couple to transceiver 22.

Counter 30 receives timing clock signals on input 31 from clock divider 54, and provides event timing counts on line 302 to comparator 36. When comparator 36 determines that the timing count received from counter 30 matches the execution TIME count T(i) loaded into comparator 36 from TIME portion 45 of instruction memory 42 in response to an address generated by address generator 38, then comparator 36 sends a signal, via connection 361 to enable unit 47.

Enable unit 47 receives 'end of frame' signals from counter 30 via connection 303, reads the sixth flag within status register 46 via connection 461 and provides output 471 to decoder 40. If the sixth flag within status register 46 is reset then the output signal received from the comparator 36 causes the enable unit 47 to send an enabling signal, through connection 471 to the decoder 40. Else, the decoder 40 is disabled.

Multiplexer 50 receives at inputs 502 and 503, two clock input signals from clock generator 58. Input 502 receives a higher frequency clock signal (e.g., in the MHz range) and input 503 receives a lower frequency clock (e.g., in the 10's of KHz range). Usually the various elements of radio 10 receive the higher frequency clock signal or a derivative of this clock signal while not in a halt status. When various elements of radio 10 enter a halt status they receive the lower frequency clock signal or a derivative of this clock signal. This results in substantial power saving.

When the frequency of the clock signal being used by radio 10 needs to be changed, e.g., between an 'operating' condition and a 'halt status' condition or vice versa, multiplexer 50 receives a control signal from decoder 40 via connection 409 which causes multiplexer 50 to change which of inputs 502, 503 is coupled to output 501. Thus, the frequency of the clock signal being passed by multiplexer 50 from clock source 58 to clock divider 54 is changed. Decoder 40 sends multiplexer 50 the control signal on line 409 when it executes instruction 'SWITCH CLOCK'. Multiplexer 50 then outputs the desired higher ('operating') frequency or lower ('halt status') frequency clock signals on output 501.

Clock divider 54 receives: (a) a clock signal from multiplexer 50 via connection 501, (b) a control signal from decoder 40 via connection 410, and (c) the content of clock register 52 via connection 521. Divider 54 outputs a clock signal to the elements of timing unit 16 which need to receive a clock signal of the same frequency as that received by counter 30. For simplicity and convenience of explanation, most of these clock connections are not shown in FIG. 4, but connection 31 from clock divider 54 to counter 30 is shown by way of example.

Clock register 52 is coupled to control unit 18 via connection 183. The content of clock register 52 reflects the desired division ratio between the frequency of the clock signal which enters clock divider 54 from connection 501, to the frequency of the clock signal which is output by clock divider 54 on line 31. Control logic 18 desirably loads clock register 52 with the desired division ratio factor or constant so that it is available when a 'SWITCH CLOCK' instruction is executed.

For example, if the multiplexer 50 is supplying clock divider 54 with the higher frequency clock signal then clock divider 54 divides the higher frequency clock signal by a first factor or constant to obtain the clock signal on output 31 for counter 30. If multiplexer 50 supplis supplying clock divider 54 with the lower frequency clock signal, then divider 54 divides it by a second factor or constant to obtain the clock signal for counter 30. The first and second constants or factors are chosen in relation to the higher and lower clock signal frequencies coming from clock generator 58 so that the clock frequency for timer operation output from divider 54, e.g., on line 31 to counter 30, remains in a predetermined range, e.g., conveniently but not essentially in the KHz to 10's of KHz range. It is preferred but not essential that the clock frequency supplied by divider 54 to timer counter 30 remain substantially constant, independent of the clock frequency selected by multiplexer 50.

If multiplexer 50 has previously chosen input 502, which receives the higher frequency clock signal and there is a need to switch to the lower frequency clock signal received at input 503 of multiplexer 50 or vice versa, then clock register 52 is loaded with the appropriate constant so that the changed input clock frequency is divided by the proper factor in clock driver 54 to maintain the output thereof in the predetermined range. When clock register 52 is loaded with the appropriate constant, a 'SWITCH CLOCK' instruction can be executed.

When a 'SWITCH CLOCK' instruction is executed, decoder 40 sends to clock divider 54 a load signal via connection 410. The load signal causes clock divider 54 to be loaded with the content of clock register 52. Alternatively, it causes counter 30 to fetch the content of count register 52. Multiplexer 50 receives a control signal from decoder 40, via output 409 of decoder 409, which causes it to select an input other then the currently chosen input.

Those who are skilled in the art will appreciate that the various elements of radio 10 can work with a plurality of clocks and can also switch between the clocks and clock frequencies regardless of the halt state.

FIG. 5 is simplified schematic diagram 60 showing pictorially how a 'HALT COUNTER' or 'SWITCH CLOCK' command is provided. Stored in locations 54(i) in memory 42 are instructions I(i) comprising EVENT operands O(i) and associated TIME values T(i), where i=1 to N, i being an integer and N being the last instruction to be executed by radio 10, e.g., during a particular communication frame. The instructions 'HALT COUNTER' and 'SWITCH CLOCK' are depicted as being loaded into memory location 54(N) and 54(N−1) respectively. Other instructions I(i) loaded into locations 54(i)=54 (1) . . . 54(N−3) are also symbolically depicted. The exact nature of these other instructions is not important to the present invention.

Associated with each EVENT operand O(i) in memory location 54(i) is a time value T(i) for i=1 . . . N. The time values T(i) are the times, measured for example by counter 30, at which the corresponding operand O(i) of each instruction I(i) is to be executed. Instructions I(i) are loaded into memory 42 by control unit 18 according to the needs of the user of the radio to control its operation. When memory 42 is accessed, instruction I(i) comprising operand O(i) and corresponding execution time value T(i) at memory address 54(i) are delivered to other parts of the timing unit 16, as described in FIG. 4.

Timing unit 16 is shown by way of example in FIG. 4, but those of skill in the art will understand that the functions performed by timing unit 16 and described herein can be performed by the elements shown in any of FIGS. 1–4. When timing unit 16 receives instruction I(N)=do EVENT [defined by O(N)] at TIME [defined by T(N)]="HALT COUNTER" at time T(N−1), it executes the 'HALT COUNTER' instruction as described previously and in FIG. 6. When timing unit 16 receives instruction I(N−1)=do EVENT [defined by O(N−1)] at TIME [defined by T(N−1)]="SWITCH CLOCK" at time T(N−1), it executes 'SWITCH CLOCK' instruction as described previously and in FIG. 6.

FIG. 6 is a simplified flow chart diagram of method 100 for halting or performing other instructions in radio 10, according to a preferred embodiment of the present invention.

'BEGIN' step 110 is coupled to 'WRITE SET' step 112, as indicated by path 111. In Step 112, instructions I(i) for i<N are provided. These instructions, for example, cause various radio operations to occur within a given communication frame and are conveniently determined by the radio programmer and may or may not be influenced by the radio user. Step 112 is conveniently coupled to 'HALT INITIAL' step 116, to 'CLOCK SWITCH INITIAL' step 114 and to 'FIRST END OF FRAME INITIAL' step 118, as indicated by paths 113, 107 and 105.

In step 114 radio 10 is initialized if an instruction of "SWITCH CLOCK" was written to timing unit 16 during step 112.

In step 118 radio 10 is initialized if the execution of the N instructions, which were written to timing unit during step 112, are to be synchronized to the first end of a communication frame.

In step 116 a flag (e.g. the fourth flag) within status register 46 can be set or reset and another flag (e.g. the third flag) within status register 46 can be set, according to a chosen halt mode.

As indicated by paths 119, 115 and 117, radio 10 can be initialized in more then a single configuration. For example, radio 10 can be initialized to execute a "SWITCH CLOCK" instruction, and/or, as indicated by path 115 it can be initialized to work in a selected halt mode, and/or, as indicated by path 119 it can synchronize its operation with the end of the first communication frame, during step 118.

Step 118 desirably includes several substeps also shown in FIG. 6. In substep 118@1 the sixth flag is read. If the sixth flag is set there is a need to check the fifth flag, during step 118@2. If the sixth flag is not set, radio 10 goes to output 125. If the fifth flag is set, then, during substep 118@3 the execution of the set of N instructions is postponed until the end of the first communication frame received by radio 10. If the fifth flag was not set, the execution logic 32 goes to output 125. During substep 118@4 the fifth flag is reset. Step 114 includes writing a value to the clock register 52, as explained previously.

As indicated by paths 121, 123 and 125, after initializing radio 10 by at least one of steps 114, 116, and 118, the N instructions are read and executed.

In 'READ INSTRUCTION AND FLAGS' step 122, an instruction I(i) for i<N is provided and read, and the flags can be read. The instruction I(i) is fetched from instruction memory 42 and preferably the instruction opcode O(i) is stored in decoder 40 and the instruction execution time T(i) is stored in the comparator 36.

As indicated by path 135 if instruction I(i) is 'HALT COUNTER', or if the second flag is set, radio 10 goes to 'LAST INSTRUCTION' query step 130 and checks if I(i) is the last instruction out of the set of N instructions. If "YES" radio 10 goes to 'HALT COUNTER' step 134 and enters a halt state, as indicated by path 147. If "NO", radio 10 goes to 'FOURTH FLAG SET' query step 132 and checks if the fourth flag is set, as indicated by path 143. As indicated by path 139, if "NO" radio 10 executes instruction I(i) at time T(i) during 'EXECUTE INSTRUCTION' step 126. If "YES", then radio 10 goes to 'HALT COUNTER' step 134 and enters a halt state, as indicated by path 145.

As indicated by path 131 if the instruction is 'SWITCH CLOCK' then 'CLOCK SWITCH MODE' step 120 is executed. During step 120 multiplexer 50 receives a control signal which causes it to change its selected input, so that a new clock signal is input to clock divider 54. Also, clock register 52 writes to clock divider 54 the constant stored within it, which determines the ratio between the clock signal frequency input to clock divider 54 and the clock signal frequency output by the clock divider 54.

As indicated by path 137 if the instruction is not 'HALT COUNTER' and is not 'SWITCH CLOCK', then its opcode O(i) is executed at time T(i) in step 126. After the execution of instruction I(i) the next instruction is read, as indicated by path 133.

After the last instruction has been executed in step 134, radio 10 remains in a halt status until, as indicated by path 109, a subsequent frame arrives or other event occurs which causes process 100 to repeat with the same or different instructions I(i).

It will be understood by those skilled in the art that various changes in form and detail can be made without departing from the spirit and scope of the invention which is determined by the claims that follow. While the present invention has been describe by way of example for use in conjunction with a radio, persons of skill in the art will understand that it is broadly applicable to different types of electronic apparatus and it is intended to interpret "radio" to include such in the claims that follow.

What is claimed is:

1. A radio having a halting apparatus, the radio comprising:
   a timing unit providing a timing signal within the radio;
   a control unit coupled to the timing unit;
   a memory coupled to the control unit, for receiving a series of instructions I(i) from the control unit, the instruction I(i) comprising operand instructions O(i) for controlling operations of the radio and time of execution instructions T(i) specifying when each O(i) is to be executed, where i is an index having values 1 to N;
   a status register, having a plurality of flags, coupled to the control logic and timing unit, for indicating the status of the timing unit and for saving a control unit request to synchronize timing unit operation;
   wherein, when the timing unit is stopped, it sets a timing unit status flag within the status register;
   wherein, the timing unit resets the timing unit status flag following the end of a first communication frame received by radio after the timing unit is started or after the timing unit exits a halt status; and
   wherein, when the timing unit status flag is set, the timing unit does not execute further instructions within the communication frame.

2. The radio of claim 1, wherein when the synchronization flag is reset, the timing unit executes a series of instructions regardless of the state of the timing unit status flag.

3. An electronic control apparatus comprising:
   execution logic for storing instructions and their execution times, and for executing said instructions at the stored execution times;
   a timing unit providing a timing signal within the apparatus;
   a status register for receiving several status flags;
   a control unit, coupled to the execution logic and to the status register, for writing a series of instructions, updating the status register and for deciding when to shut down non-vital elements of the apparatus; and
   wherein the status register is coupled to the execution logic, for indicating the status of the execution logic, and for saving control unit requests to halt the timing unit by shutting the non-vital elements.

4. The apparatus of claim 3 wherein one of the series of instructions is a 'HALT COUNTER' instruction, causing non-vital elements of the timing unit of the electronic control apparatus to shut down, and after executing a 'HALT COUNTER' instruction, the execution logic writes a close indication flag in the status register indicating that timer halt instruction was executed, wherein said close indication flag can be read by control unit.

5. The apparatus of claim 3 wherein the timing unit comprises:
   a counter, for timing events;
   a memory, for storing the instructions and their predetermined execution time; and
   a comparator, coupled to the memory and to the counter, for comparing the predetermined execution time of each instruction to a output of the counter, and determines when to execute each instruction.

6. An electronic apparatus for controlling timing, comprising:
   an electronic subassembly for storing and providing instruction operands;
   a clock generator providing at least first and second clock frequencies;
   a multiplexer coupled to the clock generator and the subassembly for selecting one or the other of the first and second clock frequencies in response to an instruction operand;
   a clock divider coupled to the multiplexer for dividing the one clock frequency by a selectable constant determined by the same or another instruction operand, said clock divider providing an output clock signal to the subassembly for determining execution times of the instruction operands;
   wherein when an instruction operand causes the multiplexer to select a different one of the at least first and second clock frequencies, a different constant is loaded into the clock divider so as to maintain the output clock signal of the clock divider within a predetermined range independent of which of the first and second clock frequencies is selected by the multiplexer.

7. A method for operating a radio, including the steps of:
   providing instructions I(i) to be executed by the radio wherein each instruction I(i) comprises an operand O(i) and an execution time T(i) for the operand, where i is an index; then in either order,
   initializing the radio according to at least one of the following steps:
      synchronizing the radio operation to an end of a first communication frame received by the radio after exiting a halt state or being started;
      setting or resetting a close mode flag and a execution indication flag within a status register;
      writing a constant to a clock source, wherein the constant determines the frequency of the output signal of the clock source; and
      reading operand instruction O(i) for i<N and the close indication flag, and:
         (a) if operand instruction O(i) is 'SWITCH CLOCK' then changing the output frequency of the clock source; and
         (b) if instruction is 'HALT COUNTER' or if the close indication flag is set then checking if I(i) is the last instruction out of the set of N instructions; and
            (b.1) if "YES" entering a halt state; and
            (b.2) if "NO" then checking if close mode flag is set, and
               (b.2.1) if "NO" then executing instruction I(i), for i<N at time T(i); else
               (b.2.3) entering a halt state; and
   halting operation of a timing unit of the radio until the end of a first communication frame received by radio after the radio exits a halt status.

8. The method of claim 7 wherein when the radio enters a halt status, a clock signals source of the radio outputs a lower frequency clock signal; and wherein when the radio exits a halt status, the clock signals source outputs a higher frequency clock signal.

9. The method of claim 7 wherein the synchronizing step comprises:
   reading a synchronization flag within the status register;
   if the synchronization flag is set, reading a timing unit status flag within the status register;
   if the timing unit status flag is set, disabling the radio from executing instructions I(i) until a timing unit of the radio indicates that the first communication frame has ended; and then
   resetting the timing unit status flag.

* * * * *